United States Patent
Lin

(10) Patent No.: US 7,534,511 B2
(45) Date of Patent: May 19, 2009

(54) THERMAL CONTROL OF FUEL CELL FOR IMPROVED COLD START

(75) Inventor: Bruce Lin, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 547 days.

(21) Appl. No.: 11/472,819

(22) Filed: Jun. 21, 2006

(65) Prior Publication Data

US 2007/0003802 A1    Jan. 4, 2007

Related U.S. Application Data

(60) Provisional application No. 60/872,410, filed on Jun. 23, 2005.

(51) Int. Cl.
*H01M 8/04* (2006.01)
(52) U.S. Cl. .............................. 429/13; 429/24; 429/26
(58) Field of Classification Search .................. 429/24, 429/26
See application file for complete search history.

(56) References Cited

U.S. PATENT DOCUMENTS

| | | | |
|---|---|---|---|
| 2003/0087139 A1 | 5/2003 | White | |
| 2003/0162063 A1* | 8/2003 | Yoshizawa et al. | 429/24 |
| 2003/0232226 A1 | 12/2003 | Morishima et al. | |
| 2004/0081870 A1 | 4/2004 | Miyazawa et al. | |
| 2004/0166388 A1* | 8/2004 | Wheat et al. | 429/24 |
| 2004/0229097 A1 | 11/2004 | Hirakata et al. | |
| 2005/0120731 A1* | 6/2005 | Lamont et al. | 62/259.2 |

FOREIGN PATENT DOCUMENTS

| | | |
|---|---|---|
| DE | 10326053 A1 | 1/2005 |
| GB | 2407432 A | 4/2005 |
| JP | 2000324617 A | 11/2000 |
| JP | 2005-322527 | 11/2005 |
| WO | WO 03/081704 A2 | 10/2003 |

OTHER PUBLICATIONS

Abstract (English) of JP 2000324617. Iwasaki, published Nov. 24, 2000.

* cited by examiner

*Primary Examiner*—Jonathan Crepeau
*Assistant Examiner*—Stephan Essex
(74) *Attorney, Agent, or Firm*—Crowell & Moring LLP

(57) ABSTRACT

Improvements in startup time for an electrochemical fuel cell system from freezing and sub-freezing temperatures are obtained by utilizing an insulated fuel cell stack in combination with an thermal control subsystem. Temperature of the insulated electrochemical fuel cell stack, as well as temperature of the ambient environment, are monitored and a heating fluid is heated by thermal transfer with the environment under appropriate thermal conditions. The heated fluid is then passed to the insulated fuel cell in order to increase the temperature of the same, typically to a temperature at or near the temperature of the ambient environment. In this manner, ambient heat from the environment is utilized to increase the temperature of the insulated fuel cell stack, thus improving conditions for subsequent cold start of the insulated fuel cell stack.

10 Claims, 2 Drawing Sheets

THERMAL CONTROL OF FUEL CELL FOR IMPROVED COLD START

CROSS-REFERENCE TO RELATED APPLICATION

This application claims the benefit under 35 U.S.C. § 119(e) of U.S. Provisional Patent Application No. 60/872,410 filed Jun. 23, 2005 (formerly U.S. application Ser. No. 11/165,620, converted to provisional by petition filed Jun. 2, 2006), which provisional application is incorporated herein by reference in its entirety.

BACKGROUND OF THE INVENTION

1. Field of the Invention

The present invention generally relates to a thermal control system for an electrochemical fuel cell, as well as a method for improving thermal conditions for cold start of an insulated fuel cell stack.

2. Description of the Related Art

Electrochemical fuel cells convert reactants, namely fuel and oxidant fluid streams, to generate electric power and reaction products. Electrochemical fuel cells employ an electrolyte disposed between two electrodes, namely a cathode and an anode. The electrodes each comprise an electrocatalyst disposed at the interface between the electrolyte and the electrodes to induce the desired electrochemical reactions. The location of the electrocatalyst generally defines the electrochemically active area.

Polymer electrolyte membrane (PEM) fuel cells generally employ a membrane electrode assembly (MEA) consisting of an ion-exchange membrane disposed between two electrode layers comprising porous, electrically conductive sheet material as fluid diffusion layers, such as carbon fiber paper or carbon cloth. In a typical MEA, the electrode layers provide structural support to the ion-exchange membrane, which is typically thin and flexible. The membrane is ion conductive (typically proton conductive), and also acts as a barrier for isolating the reactant streams from each other. Another function of the membrane is to act as an electrical insulator between the two electrode layers. The electrodes should be electrically insulated from each other to prevent short-circuiting. A typical commercial PEM is a sulfonated perfluorocarbon membrane sold by E.I. Du Pont de Nemours and Company under the trade designation NAFION®.

The MEA contains an electrocatalyst, typically comprising finely comminuted platinum particles disposed in a layer at each membrane/electrode layer interface, to induce the desired electrochemical reaction. The electrodes are electrically coupled to provide a path for conducting electrons between the electrodes through an external load.

In a fuel cell stack, the MEA is typically interposed between two separator plates that are substantially impermeable to the reactant fluid streams. The plates act as current collectors and provide support for the electrodes. To control the distribution of the reactant fluid streams to the electrochemically active area, the surfaces of the plates that face the MEA may have open-faced channels formed therein. Such channels define a flow field area that generally corresponds to the adjacent electrochemically active area. Such separator plates, which have reactant channels formed therein are commonly known as flow field plates. In a fuel cell stack, a plurality of fuel cells are connected together, typically in series, to increase the overall output power of the assembly. In such an arrangement, one side of a given plate may serve as an anode plate for one cell and the other side of the plate may serve as the cathode plate for the adjacent cell. In this arrangement, the plates may be referred to as bipolar plates.

The fuel fluid stream that is supplied to the anode typically comprises hydrogen. For example, the fuel fluid stream may be a gas such as substantially pure hydrogen or a reformate stream containing hydrogen. Alternatively, a liquid fuel stream such as aqueous methanol may be used. The oxidant fluid stream, which is supplied to the cathode, typically comprises oxygen, such as substantially pure oxygen, or a dilute oxygen stream such as air. In a fuel cell stack, the reactant streams are typically supplied and exhausted by respective supply and exhaust manifolds. Manifold ports are provided to fluidly connect the manifolds to the flow field area and electrodes. Manifolds and corresponding ports may also be provided for circulating a coolant fluid through interior passages within the stack to absorb heat generated by the exothermic fuel cell reactions. The preferred operating temperature range for PEM fuel cells is typically 50° C. to 120° C., most typically between 60° C. and 85° C.

Under typical conditions, start-up of the electrochemical fuel cell stack is at a temperature above the freezing temperature of water, and the fuel cell stack can be started in a reasonable amount of time and quickly brought to the preferred operating temperature. In some fuel cell applications, it may be necessary or desirable to commence operation of an electrochemical fuel cell stack when the stack temperature is below the freezing temperature of water (commonly referred to as "freeze-start" conditions), and even at subfreezing temperatures below −25° C. However, at such low temperatures, the fuel cell stack does not operate well and rapid start-up of the fuel cell stack is more difficult. It may thus take a considerable amount of time and/or energy to bring an electrochemical fuel cell stack from a starting temperature below the freezing temperature of water up to an efficient operating temperature.

A variety of techniques have been developed and/or proposed to address this issue, including the addition of various heating elements and/or heat-exchanging subsystems that are designed to quickly increase the temperature of the fuel cell stack. Another technique involves insulation of the fuel cell stack itself. Thus, if the ambient temperature is at or below the freezing temperature of water, the stack temperature may stay above freezing for some extended period of time following shut down, which permits more favorable starting conditions should the stack be restarted during this period of time.

While advances have been made associated with cold start of fuel cell stacks, there remains a need in the art for improved and/or more efficient techniques relating to the same. The present invention fulfills such needs and provides further related advantages.

BRIEF SUMMARY OF THE INVENTION

In brief, a thermal control subsystem is disclosed for an electrochemical fuel cell system, particularly with regard to improving thermal conditions for cold start of an insulated fuel cell stack. A disadvantage of insulating the fuel cell stack is that it is also insulated from increasing temperature as the ambient temperature rises. Thus, if the insulated fuel cell stack is exposed to freezing temperatures for a prolonged period of time, it will take longer for the insulated fuel cell stack to warm as the ambient temperature increases.

In one embodiment, a method is disclosed for thermally controlling an electrochemical fuel cell system having an insulated electrochemical fuel cell stack. The method comprises monitoring the temperature of the insulated electrochemical fuel cell stack; monitoring the temperature of the ambient environment; heating a heating fluid by thermal transfer with the environment when the temperature of the ambient environment is above the temperature of the insulated fuel cell stack; and passing the heated fluid to the insulated fuel cell stack. In this manner, the fuel cell stack may be heated to a temperature at or near the temperature of the ambient environment.

In another embodiment, a thermal control subsystem is disclosed comprising a heating loop fluidly connected to the insulated electrochemical fuel cell stack, the heating loop capable of carrying a heating fluid; a heat exchanger fluidly connected to the heating loop, the heat exchanger capable of transferring ambient thermal energy from the environment to the heating fluid; a first temperature sensor for detecting the temperature of the electrochemical fuel cell stack ($T_s$); a second temperature sensor for detecting the temperature of the ambient environment ($T_a$); a pump for circulating the heating fluid within the heating loop; one or more optional valves within the heating loop; and a controller in communication with the first temperature sensor, the second temperature sensor, the optional valve(s) and the pump, the controller programmed to activate the pump and open the optional valve(s) when the temperature of the ambient environment is ($T_a$) is greater than the temperature of the electrochemical fuel cell stack ($T_s$).

These and other aspects of the invention will be evident upon reference to the attached figures and following detailed description.

BRIEF DESCRIPTION OF THE DRAWINGS

The provided FIGURES illustrate certain non-optimized aspects of the invention, but should not be construed as limiting in any way.

DETAILED DESCRIPTION OF THE INVENTION

Figure 1:
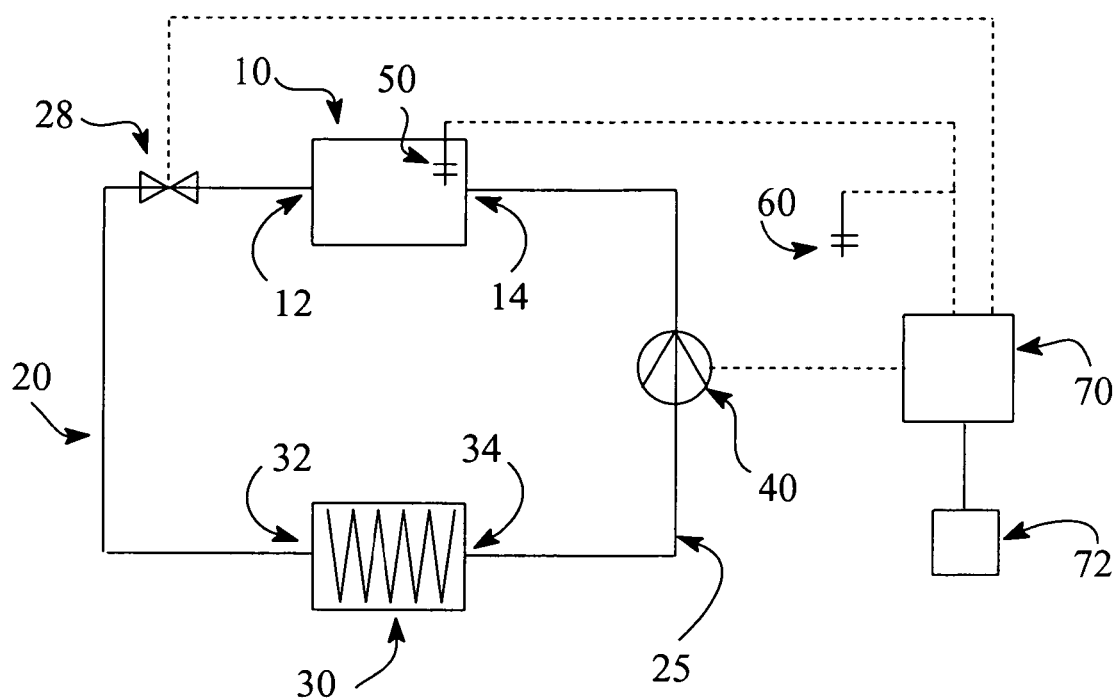
FIG. 1 is a representative embodiment of a thermal control subsystem for an electrochemical fuel cell system having an insulated electrochemical fuel cell stack.

As mentioned above, a thermal control subsystem for an electrochemical fuel cell system is disclosed. The electrochemical fuel cell system comprises an insulated electrochemical fuel cell stack. The fuel cell stack may be insulated by any of a variety of suitable techniques known to one skilled in this field, including (but not limited to) use of insulating materials such as foams, or by employing appropriate isolation techniques, such as vacuum gaps.

The thermal control subsystem comprises a heating loop fluidly connected to the insulated electrochemical fuel cell stack, the heating loop capable of carrying a heating fluid. The heating loop is also fluidly connected to a heat exchanger, the heat exchanger capable of transferring ambient thermal energy from the environment to the heating fluid. In this way, heat from the ambient environment may be transferred to the heating fluid within the heating loop, and then transferred to the insulated fuel cell stack by circulation of the heating fluid.

The thermal control subsystem further comprises a first temperature sensor capable of detecting the temperature of the electrochemical fuel cell stack ($T_s$); and a second temperature sensor capable of detecting the temperature of the ambient environment ($T_a$). Suitable temperature sensors in this regard are well known, and need not be further exemplified.

A pump is associated with the heating loop such that the heating fluid can be circulated within the heating loop. The heating fluid exits the insulated fuel cell stack, enters the heat exchanger, exits the heat exchanger, and returns to the insulated fuel cell stack, after which the cycle may be repeated. One or more optional valves may also be associated with the heating loop such that the insulated fuel cell stack is isolated from the remainder of the heating loop. In this manner, thermal transfer from the insulated fuel cell stack to the heating fluid may be minimized by preventing convection circulation of the heating fluid.

A controller is in communication with the first temperature sensor, the second temperature sensor, the pump and valve(s). The controller is programmed to activate the pump and open the optional valve(s) when the temperature of the ambient environment is ($T_a$) is greater than the temperature of the electrochemical fuel cell stack ($T_s$) as explained in greater detail below.

During operation of an insulated fuel cell stack, the temperature of the stack, as well as the associated systems in direct or fluid communication with the stack, are at an elevated temperature. As noted previously, the operating temperature for PEM fuel cells is typically in the range of between 60° C. and 85° C. Thus, the various associated subsystems in direct or fluid communication with the stack are similarly at an elevated temperature. For example, the coolant subsystem, including the radiator, coolant tubing, coolant pump, and the like, are generally at a temperature on the order of 60° C. at fuel cell shutdown. Following shut down, and assuming a colder ambient temperature, the various associated fuel cell subsystems begin to cool. If, for example, the ambient temperature is at –25° C., the various associated fuel cell subsystems will cool rapidly. Under such conditions, and in order to delay cool down of the fuel cell stack, the stack may be insulated in a manner such that the stack stays warmer for an extended period of time. Thus, if the fuel cell is restarted at a later time (e.g., 3 hours later) it may have only cooled to 20° C., which is still above freezing and thus permits more favorable restart conditions.

However, after a sufficiently long period of time, the insulated fuel cell stack will eventually cool to ambient temperature, such as –25° C., as discussed above. Restarting the fuel cell from a temperature below the freezing point of water is commonly referred to as a "freeze-start", and involves any number of techniques known to those skilled in this field. If the ambient temperature increases from, for example, –25° C. to 5° C., the insulation of the fuel cell stack will serve to delay an increase in temperature of the fuel cell stack. In other words, the fuel cell stack is insulated from increasing ambient temperature, such that as the ambient temperature increases, the insulated fuel cell stack will undesirably remain at a lower temperature. If this lower temperature is below 0° C., freeze-start of the fuel cell is required, even though the ambient temperature may be above freezing. Further, even if the ambient temperature remains below freezing, an increase in the temperature of the fuel cell stack from, for example, –25° C. to –10° C., is still beneficial by creating more favorable conditions for freeze-start.

Accordingly, ambient heat from the environment is utilized to increase the temperature of an insulated fuel cell stack. Following shut down, the insulated fuel cell stack may be thermally isolated from the remainder of the heating loop by closing optional valve(s). In this manner, thermal heat loss via the heating loop may be minimized (e.g., heat loss via convection circulation of the heating fluid). The ambient temperature of the environment and the fuel cell stack temperature may also be measured. Typically, the fuel cell stack temperature is measured at a location within the fuel cell stack that is representative of the entire stack (e.g., at or near the center of the stack), and is referred to herein as the "core" temperature of the fuel cell stack. If the core temperature of the fuel cell stack is higher than the ambient temperature, the insulated fuel cell stack remains isolated from the remainder of the heating fluid (e.g., the optional valve(s) remains closed). On the other hand, if the ambient temperature is higher than the core temperature of the fuel cell stack, ambient heat from the environment may be utilized to increase the temperature of the insulated fuel cell stack.

As the difference between the ambient temperature of the environment and the insulated fuel cell stack increases, the ability to transfer thermal energy to the insulated fuel cell stack generally becomes more efficient. For example, a gradient of 10° C. allows more effective thermal transfer than a gradient of 1° C. Thus, in a more specific embodiment, a minimum temperature gradient or "offset" is required before transfer of thermal energy proceeds. This offset may be determined based on the specific energy requirements of the system at hand, and should weight the benefits of increasing the temperature of the insulated fuel cell against the power required of the fuel cell system to achieve such an increase. For example, a suitable temperature offset ($T_{offset}$) may be in the range of 1° C. to 15° C., or in the range of from 2° C. to 5° C.

In addition to determining the temperature of the ambient environment and the insulated fuel cell stack, the state of charge (SOC) of the battery associated with the fuel cell system should also be evaluated. Any load on the battery associated with the practice of this invention should not deplete the battery to a level that would be insufficient to power a subsequent start-up of the fuel cell. In other words, a reserve SOC ($SOC_{reserve}$) should be maintained.

Provided that the appropriate temperature offset and reserve SOC are satisfied, the optional valve(s) isolating the insulated fuel cell stack from the heating loop are opened and the pump turned on, resulting in the circulation of the heating fluid within the heating loop. It should be understood that reference herein to the heating fluid and the heating loop is, in one embodiment, synonymous with reference to the coolant fluid and the coolant loop typically used to cool a fuel cell stack. However, in this embodiment the coolant system is operating as a heating system—that is, the coolant is operating as a heating fluid, and the coolant loop is operating as a heating loop. Thus, to clarify that thermal transport is from the ambient environment to the insulated fuel cell stack (as opposed to from the fuel cell stack to the ambient environment), these elements are referred to herein as the heating fluid and the heating loop.

The heating loop is fluidly connected to one or more exit ports of the insulated fuel cell stack such that the heating fluid, after passing through the insulated fuel cell stack, travels through a heat exchanger in communication with the ambient environment, thereby heating the heating fluid. The heat exchanger is, in turn, fluidly connected to one or more input ports of the insulated fuel cell stack, such that the heating fluid after exiting the heat exchanger (now heated to a temperature at or near ambient temperature), passes into the insulated fuel cell stack. This heated heating fluid transfers thermal energy to the insulated fuel cell stack, thereby raising the temperature of the insulated fuel cell stack. The heating fluid then exits the insulated fuel cell stack for recirculation through the heat exchanger and back into the insulated fuel cell stack.

The result of the circulating heating fluid is that the temperature of the insulated fuel cell stack is raised, typically to a temperature at or near the ambient environmental temperature. Once such a temperature is reached, the pump may be stopped and the optional valve(s) closed in order to stop circulation of the heating fluid. By this technique, the insulated fuel cell stack can be freeze-started from a more benign temperature, or may even result in thawing of the insulated fuel cell stack such that freeze-start may be avoided. Thus, by insulating the fuel cell stack, the number of start ups from subzero temperatures may be reduced (since the insulated fuel cell stack remains at an elevated temperature for a longer period following shut down), and the conditions associated with start up, particular freeze-start, may be rendered more advantageous.

The energy cost for this process is very low, and quite manageable for a storage battery to accommodate. Other than minimal power to open valve(s) and monitor temperatures, the only load during operation is that of the pump. The pump, however, does not draw a significant load, and need only be operated for relatively short period of time. Once the temperature of the insulated fuel cell stack has reached a desired temperature in relation to the ambient temperature, the pump is stopped. If a further temperature offset is satisfied, the process can be repeated. In other words, the process can be repeated whenever the ambient temperature warms to a level sufficient to make the thermal transfer of energy to the insulated fuel cell stack worth the energy cost of running the pump.

In the practice of this process, it should be understood that additional components may be associated with the heating loop disclosed herein, particularly in the context of automotive applications. Such additional components include those typically associated with, for example, an automotive coolant system, and are well known to one skilled in this field.

In another embodiment, the heating fluid may be air. As noted above, the heating fluid serves to transfer thermal energy from the ambient environment to the insulated fuel cell stack when a suitable temperature offset has been reached. While a liquid heating fluid generally has a greater heat capacity than air, air may also be used as the heating fluid (either alone or in combination with a liquid heating fluid). In this embodiment, air is circulated through the heating loop in the manner noted above. Alternatively, air (at ambient temperature) may be blown into the insulated fuel cell stack, and exit after having transferred some portion of its thermal energy to the insulated fuel cell stack. In this embodiment, the pump may be a blower or compressor, and the heat exchanger may be omitted, and the heating loop may be closed or open (with the air, after having passed through the insulated fuel cell stack, returning to the ambient environment).

In still a further alternative embodiment, the heating fluid may be a liquid heating fluid (e.g., coolant), and circulation through the insulated fuel cell stack is by convection circulation (as opposed to pump driven). In this manner, the insulated fuel cell stack is arranged in relationship to the heating loop such that thermal transfer from the heating fluid to the insulated fuel cell stack is accomplished by natural convection circulation of the heating fluid when a suitable temperature offset has been reached.

Referring to FIG. 1, a representative thermal control subsystem for an electrochemical fuel cell system having an insulated electrochemical fuel cell stack is depicted. Insulated fuel cell stack 10 is fluidly connected via conduit 20 to radiator 30. Within conduit 20 is a heating fluid (not shown), such as an antifreeze solution, that exits fuel cell stack outlet port(s) 12 and enters radiator inlet port(s) 32. Within radiator 30, thermal energy from the ambient environment is transferred to the heating fluid. Radiator 30 is, in turn, fluidly connected via conduit 25 to insulated fuel cell stack 10.

Heating fluid passing out of radiator 30 via outlet port(s) 34 travels through conduit 25 to fuel cell stack inlet port(s) 14. Within insulated fuel cell stack 10, thermal energy from the heating fluid is transferred to the insulated fuel cell stack.

Flow of heating fluid from insulated fuel cell stack 10, through conduit 20 to radiator 30, and then from radiator 30, through conduit 25 and back to insulated fuel cell stack 10, constitutes the heating loop. It should be understood that this heating loop utilizes heating fluid to transfer heat to the insulated fuel cell stack. Of course, when the insulated fuel cell is in normal operation, these same components may serve as a cooling loop, transferring thermal energy from insulated fuel cell stack 10 to the environment via radiator 30. However, for purposes of this invention, the coolant serves the opposite purpose—that is, it carries heat to the insulated fuel cell.

Circulation of the heating fluid within the heating loop is accomplished with pump 40. When in operation, valve 28 is opened to permit circulation of the heating fluid within the heating loop. When closed, valve 28 prevents circulation of heating fluid within the heating loop. While valve 28 is depicted in conduit 20, it should be understood that valve 28 may be at any position along the heating loop, including (without limitation) immediately adjacent to inlet/outlet ports 12 and/or 14. Further, multiple valves may be employed. While the valve may be omitted altogether, closing the valve(s) provides advantages with regard to retention of heat within the insulated fuel cell stack.

Pump 40 and valve 28 are controlled by controller 70. One skilled in this field will appreciate that any number of controllers may be used for this purpose, and further disclosure regarding the same is not necessary herein. Controller 70 is also in communication with insulated fuel cell stack sensor 50 and ambient temperature sensor 60. By monitoring the temperature of the insulated fuel cell stack (e.g., the core temperature) and the ambient temperature, controller 70 can be programmed to open valve 28 and start pump 40, such that thermal energy from the environment is transferred to the insulated fuel cell stack by the procedures disclosed above.

Power for pump 40 is provided by battery 72, shown in FIG. 1 to be connected to controller 70 (alternatively, the battery may provide power directly to the pump). To ensure that power to the pump does not overly deplete the battery, the state of charge (SOC) of the battery is monitored. As long as the battery has sufficient charge in excess of some reserve necessary to subsequently restart the insulated fuel cell stack ($SOC_{reserve}$), then the pump can be run for a period of time sufficient to transfer the desired level of thermal energy from the environment to the insulated fuel cell. This may be accomplished by, for example, running the pump for some fixed period of time, followed by measuring the temperature of the insulated fuel cell stack and the ambient temperature. Alternatively, such temperature may be measured while the pump is running, and the pump shut down after a desired level of thermal energy has been transferred to the insulated fuel cell stack.

In this manner, thermal energy from the ambient environment serves to heat the heating fluid, which may then transfer such heat to the insulated fuel cell stack, thereby raising the temperature of the fuel cell stack to a temperature at or near ambient temperature. This is particularly useful when, for example, the ambient temperature is significantly below freezing at night, followed by a warming trend in the morning hours. An insulated fuel cell stack, while maintaining heat within the stack following shut down for a period of time longer than without such insulation, will also insulate the stack from rising temperatures. If, for example, the fuel cell stack was at a temperature of −25° C. due to outdoor storage overnight, in the morning hours the temperature may increase to, for example, −10° C. Due to insulation of the fuel cell stack, the increase in ambient temperature will not be immediately transferred to the fuel cell stack due to insulation of the stack. The present invention thus provides the transfer of thermal energy from the ambient environment to an insulated fuel cell stack via the heating fluid which is in contact with the ambient environment, thus permitting the use of an insulated fuel cell stack without the existing drawbacks associated with the same.

Figure 2:
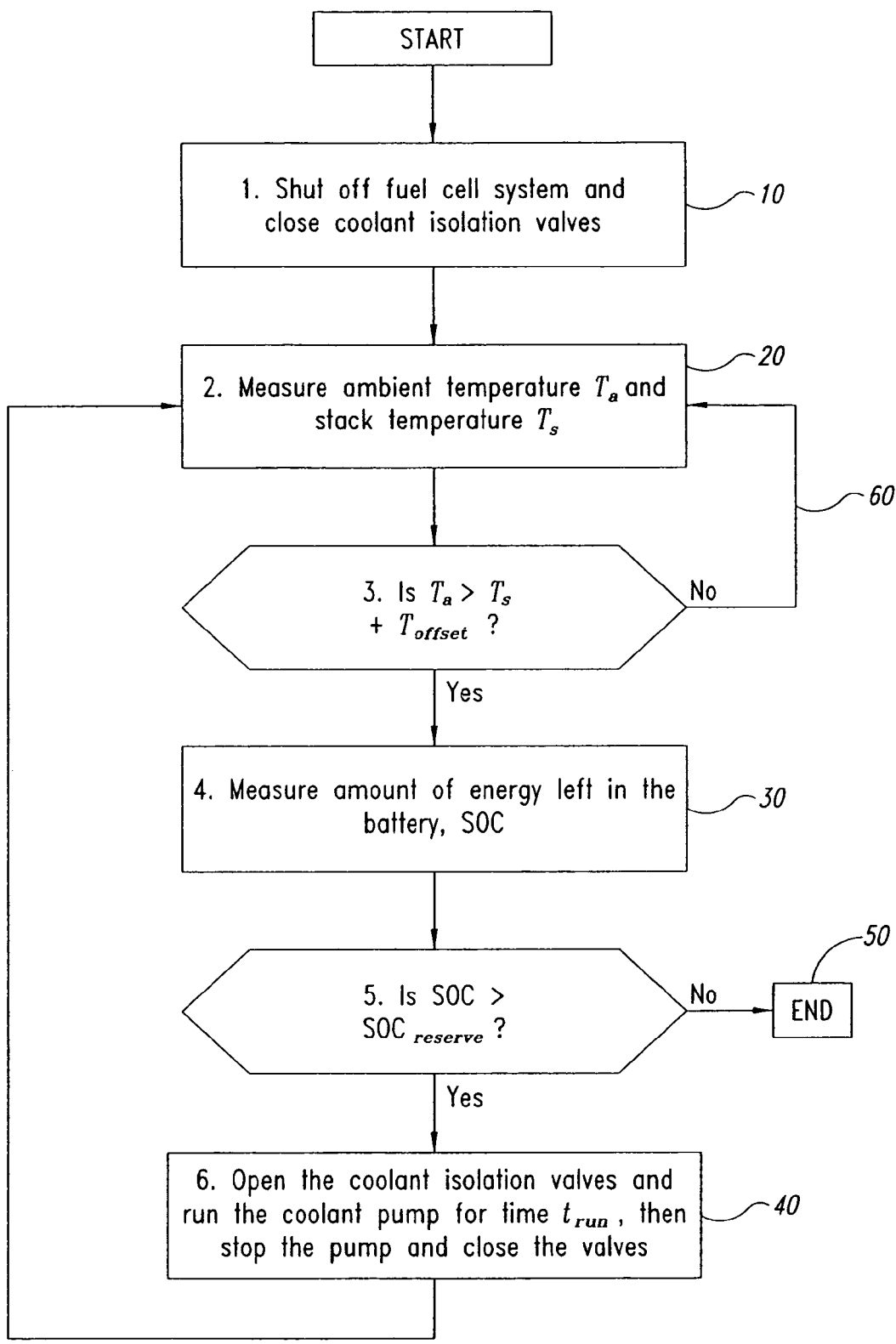
FIG. 2 is a representative flow chart showing various steps associated with monitoring and controlling the thermal control subsystem for an electrochemical fuel cell system having an insulated electrochemical fuel cell stack.

Referring to FIG. 2, a representative control process is disclosed. In step 10, the insulated fuel cell stack is shut off and the coolant valve is closed. In step 20, the ambient temperature ($T_a$) and the temperature of the insulated fuel cell stack ($T_s$) are measured. If the ambient temperature is above that of the insulated fuel cell stack plus the desired offset temperature (i.e., if $T_a > T_s + T_{offset}$), the amount of energy remaining in the battery ("state of charge" or SOC) is measured, as shown by step 30. In step 40, if the SOC is greater than the state of charge for a predetermined reserve amount (i.e., $SOC_{reserve}$), then the coolant valve is opened and the pump run for a period of time ($t_{run}$). On the other hand, if the $SOC_{reserve}$ is not satisfied, then in step 50 the pump is not run in order to prevent depletion of the remaining battery charge. In step 60, if the ambient temperature is not above that of the insulated fuel cell stack plus the desired offset, step 20 is repeated at desired intervals. This entire control process may be repeated continually or periodically to provide the desired level of thermal energy to the insulated fuel cell stack.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for thermally controlling an electrochemical fuel cell system having an insulated electrochemical fuel cell stack, the method comprising:
   monitoring the temperature of the insulated electrochemical fuel cell stack;
   monitoring the temperature of the ambient environment;
   heating a heating fluid by thermal transfer with the environment when the temperature of the ambient environment is above the temperature of the insulated fuel cell stack; and
   passing the heated fluid to the insulated fuel cell stack.

2. The method of claim 1 wherein the step of heating the heating fluid is performed when the temperature of the ambient environment is above the temperature of the insulated fuel cell stack by a predetermined temperature offset.

3. The method of claim 2 wherein the predetermined temperature offset ranges from 1° C. to 15° C.

4. The method of claim 2 wherein the predetermined temperature offset ranges from 2° C. to 5° C.

5. The method of claim 1 wherein the heating fluid is a coolant in fluid communication with a radiator.

6. The method of claim 5 wherein the coolant is passed to the insulated fuel cell stack by a coolant pump.

7. A thermal control subsystem for an electrochemical fuel cell system having an insulated electrochemical fuel cell stack, the subsystem comprising:
   a heating loop fluidly connected to the insulated electrochemical fuel cell stack, the heating loop capable of carrying a heating fluid;
   a heat exchanger fluidly connected to the heating loop, the heat exchanger capable of transferring ambient thermal energy from the environment to the heating fluid such that the temperature of the heating fluid is at or near ambient temperature;

a first temperature sensor capable of detecting the temperature of the electrochemical fuel cell stack;

a second temperature sensor capable of detecting the temperature of the ambient environment;

a pump for circulating the heating fluid within the heating loop; and a controller in communication with the first temperature sensor, the second temperature sensor and the pump, the controller programmed to activate the pump when the temperature of the ambient environment is greater than the temperature of the electrochemical fuel cell stack.

8. The thermal control system of claim 7 further comprising a valve within the heating loop, the valve in a closed position when the pump is not activated.

9. The thermal control system of claim 8 wherein the controller is capable of activating the pump when the temperature of the ambient environment is greater than the temperature of the electrochemical fuel cell stack plus a predetermined temperature offset that ranges from 1° C. to 15° C.

10. The thermal control system of claim 9 wherein the predetermined temperature offset ranges from 2° C. to 5° C.

* * * * *